United States Patent
Liu et al.

(10) Patent No.: US 9,453,097 B2
(45) Date of Patent: Sep. 27, 2016

(54) METHOD FOR PREPARATION OF POLYCARBOXYLATE SUPERPLASTICIZER BY GRAFT COPOLYMERIZATION OF FATTY ACID VINYL ESTER ONTO ACRYLATE POLYMER

(71) Applicant: BEIJING UNIVERSITY OF TECHNOLOGY, Beijing (CN)

(72) Inventors: Xiao Liu, Beijing (CN); Ziming Wang, Beijing (CN); Ming Zhao, Beijing (CN); Suping Cui, Beijing (CN); Mingzhang Lan, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 14/829,505

(22) Filed: Aug. 18, 2015

(65) Prior Publication Data

US 2016/0237193 A1 Aug. 18, 2016

(30) Foreign Application Priority Data

Feb. 15, 2015 (CN) .......................... 2015 1 0081172

(51) Int. Cl.
| | |
|---|---|
| *C08F 267/06* | (2006.01) |
| *C08F 8/06* | (2006.01) |
| *C08F 8/12* | (2006.01) |
| *C08F 265/00* | (2006.01) |
| *C08F 265/04* | (2006.01) |

(52) U.S. Cl.
CPC ............. *C08F 267/06* (2013.01); *C08F 8/06* (2013.01); *C08F 8/12* (2013.01); *C08F 265/00* (2013.01); *C08F 265/04* (2013.01)

(58) Field of Classification Search
None
See application file for complete search history.

(56) References Cited

U.S. PATENT DOCUMENTS 2,957,015 A * 10/1960 Kuhn ...................... C07C 67/52
554/165
2013/0291764 A1* 11/2013 Mehalebi .............. C04B 24/026
106/808

FOREIGN PATENT DOCUMENTS

| CN | 1288870 A | 3/2001 |
| CN | 1712381 A | 12/2005 |
| CN | 102887979 | * 1/2013 |
| CN | 103483504 A | 1/2014 |

OTHER PUBLICATIONS

Translation of CN 102887979 (2013).*
"Method for testing uniformity of concrete admixture" Chinese State Standard : GB/T 8077-2012 ; Aug. 1, 2013 ; General Administration of Quality Supervision, Inspection and Quarantine of the People's Republic of China (AQSIQ) and Standardization Administration of the People's Republic of China (SAC), (Summary and p. 15).

* cited by examiner

Primary Examiner — Robert C Boyle
(74) Attorney, Agent, or Firm — J.C. Patents

(57) ABSTRACT

This invention relates to a method for preparing a polycarboxylate superplasticizer by graft copolymerization of fatty acid vinyl ester onto acrylate polymer. In this invention, a type of polycarboxylate superplasticizer by graft copolymerization of fatty acid vinyl ester onto acrylate polymer was synthesized by the processes of polymerization-grafting-alcoholysis-hydrolysis with acrylate and fatty acid vinyl ester as main reactants. In the first polymerization step, the polyacrylate was synthesized by using acrylate as monomer and a certain amount of initiator and molecular weight regulator. In the second graft copolymerization step, the graft polymer with polyacrylate as main chain and poly(fatty acid vinyl ester) as side chain was synthesized by graft copolymerization between polyacrylate and fatty acid vinyl ester. The final polycarboxylate superplasticizer product with polyacrylic acid as main chain and polyvinyl alcohol as side chain was obtained by subsequent alcoholysis and hydrolysis steps. The preparation process of this invention exhibited some characteristics including simpleness, easy controlling, low cost, environmental friendliness and pollution free. The fatty acid vinyl ester was as a reactant instead of conventional polyethylene glycol macromonomer, which enriched the applicable scope of reactive raw materials. The prepared polycarboxylate superplasticizer showed good cement paste fluidity and fluidity retention, which manifested as good adaptability to cement and application performance in concrete.

1 Claim, No Drawings

METHOD FOR PREPARATION OF POLYCARBOXYLATE SUPERPLASTICIZER BY GRAFT COPOLYMERIZATION OF FATTY ACID VINYL ESTER ONTO ACRYLATE POLYMER

CROSS-REFERENCE TO RELATED APPLICATION

This application claims the priority benefit of Chinese application serial no. 201510081172.0, filed on Feb. 15, 2015, which the entirety the prior patent application is hereby incorporated by reference herein and made a part of this specification.

TECHNICAL FIELD

This invention relates to the technical field of polycarboxylate superplasticizer used in cement and concrete, and especially relates to a typical preparation method of comb-shaped polycarboxylate superplasticizer synthesized by the first polymerization of acrylate-type monomer and then its graft copolymerization from fatty acid vinyl ester followed by alcoholysis and hydrolysis.

BACKGROUND

In recent years, with the rapid development of the construction industry, the amount of cement and concrete is increasing, and thus the cement admixture has become an essential important component in construction industry. The invention of polycarboxylate superplasticizer solved the problems of low water-reducing rate and slow setting for the first generation of lignosulfonate superplasticizer, and made up for the shortcomings of contaminated environment and fast slump loss for the naphthalene-based water reducer. Because of its advantages such as high water-reducing rate, good slump retention, fast strength growth and good compatibility, the polycarboxylate superplasticizer has become a research focus in the field of concrete admixture. As is known, the synthesis of polycarboxylate superplasticizer needs the important macromonomers namely polyoxyethylene ether and polyoxypropylene ether, which are mainly derived from ethylene oxide and propylene oxide. The industry production of polycarboxylate superplasticizer will be directly influenced once the supply shortage of ethylene oxide or propylene oxide occurs. Thus a new substitute material for the ethylene oxide and propylene oxide should be developed to get rid of the polycarboxylate superplasticizer industry's dependence on ethylene oxide and propylene oxide, which can enrich the synthetic methods of polycarboxylate superplasticizer.

With the development of design methods of molecular structure in the field of polymer science, the theoretical basis of synthesizing polymer with ideal molecular structure has been provided. The polycarboxylate superplasticizer designed and synthesized by us employs more affordable and more diverse raw materials, and possesses the comb-shaped structure similar to the structure of traditional polycarboxylate superplasticizer to ensure that it has a good anchoring force and stereo-hindrance effect. This polymer does not only possess several performances of traditional comb-shaped polycarboxylate superplasticizer, but also has some advantages including cheapness, independence of ethylene/propylene oxide and diversification of raw materials, manifesting as a very broad application value.

The patent CN1712381 (publication date: Dec. 28, 2005) reported a preparation method of polycarboxylate-g-polyether type concrete water reducer. This patent reported a method that the sulfonated styrene-maleic anhydride copolymer was obtained from sulfonating styrene-maleic anhydride copolymer by sulfonating agent without damage to anhydride groups, and then the sulfonated copolymer was mixed and reacted with polyethylene glycol followed by dissolving in water to obtain the polycarboxylate-g-polyether type concrete water reducer. This invention has the advantages of reasonable process, simple operation and mild reaction conditions. However, in this invention, the polyether was an important component of raw materials, showing a relatively simple variety of raw materials. The production of water reducer will be greatly influenced once the supply of raw material is limited.

The patent CN1288870 (publication date: Mar. 28, 2001) reported a preparation method of carboxylic acid graft type polycarboxylate superplasticizer. Two synthetic methods of carboxylic acid type polycarboxylate superplasticizer were provided in this patent. The one was that a polycarboxylate superplasticizer containing polyethoxylated side groups was copolymerized by the acrylate type monomers and the esterification product of polyoxyethylene and maleic anhydride. The other one was that a copolymer containing multi-functional groups such as carboxyl, hydroxyl and sulfonic groups was polymerized by unsaturated vinyl monomers containing side groups in a redox system. This invention method has the advantages of good product performance, easily obtained raw materials and good industrial prospects. However, in the first method of this invention, the polyoxyethylene of raw materials is also restricted by the supply of ethylene oxide; besides in the second method of this invention, the synthesized polycarboxylate superplasticizer with short side chains exhibits poorer stereo-hindrance effect than the conventional polycarboxylate superplasticizer with long side chains, showing a poorer dispersing effect to cement particles.

The patent CN103483504A (publication date: Jan. 1, 2014) reported a preparation method of the polycarboxylate superplasticizer synthesized by a macromonomer combination of two polyethers with different structures. In this patent, the isobutenyl polyethylene glycol, isopentenyl polyethylene glycol and water were added to the reactor, and then mixed and dissolved with stirring at 40-60° C., followed by adding acrylic acid and mercaptoacetic acid. After heated to 75-85° C., the aqueous solution of ammonium persulfate was dropwise added to the reaction system within 70-90 minutes followed by polymerization reaction for 2-3 hours at constant temperature. The polycarboxylate superplasticizer was finally obtained through cooling the resultants to room temperature and then adjusting the pH value to 6.8-7.2 by the aqueous solution of sodium hydroxide with a mass concentration of 30%. This polycarboxylate superplasticizer disclosed in the invention was synthesized by a copolymerization of macromonomer combination, which was beneficial to the balance between water-reducing and slump retention and the performance adjustment for the existing polycarboxylate superplasticizer products. However, in this invention, the polyether as one important component of raw materials is also restricted by the supply of ethylene/propylene oxide, which will influence the production and application of the products.

The polycarboxylate superplasticizer disclosed in the above patents mostly possesses good workability such as fluidity and dispersing ability. However, there are several shortcomings for all of the above preparation methods. All of the macromonomers used for synthesizing polycarboxylate superplasticizer are obtained from ethylene oxide or propylene oxide, manifesting as a relatively simple variety of raw materials. Once the ethylene oxide or propylene oxide is out of supply, the current production of polycarboxylate superplasticizer will be greatly influenced to further involve the concrete industry, leading to an inestimable loss. Hence, it is required that the substitutes for ethylene oxide and propylene oxide should be found as soon as possible to enrich the diversification of raw materials. Besides, it should play the similar role and mechanism in concrete system to achieve the excellent performances and ensure a high-efficient process operation and low preparation cost to industrialize easily. The related research in this area has not been reported in domestic and abroad.

SUMMARY

The objective of this invention is to provide a preparation process of polycarboxylate superplasticizer by graft copolymerization of fatty acid vinyl ester onto acrylate polymer. A type of polycarboxylate superplasticizer by graft copolymerization of fatty acid vinyl ester onto acrylate polymer was synthesized by the processes of polymerization-grafting-alcoholysis-hydrolysis with acrylate and fatty acid vinyl ester as main reactants. In this invention, a polycarboxylate superplasticizer with comb-like structure was synthesized by grafting fatty acid vinyl ester onto the main chain of polyacrylate to achieve a good water-reducing effect, based on the theory of molecular structure design. The polycarboxylate superplasticizer synthesized by using this method has a strong stereo-hindrance effect, which can effectively prevent the adverse effects of cement particle's flocculation and hydration on the flow properties. Furthermore, it represents more excellent application value and wider development prospect than the conventional polycarboxylate superplasticizer due to the cheapness of its raw materials.

The preparation method of the polycarboxylate superplasticizer by graft copolymerization of fatty acid vinyl ester onto acrylate polymer involves four steps in order of polymerization, graft copolymerization, alcoholysis and hydrolysis, which are provided in this patent. The synthesis conditions and steps were as follows:

(1) polymerization: firstly the organic solvent was added to the reactor with a risen temperature to 60-130° C. followed by adding molecular weight regulator, and then the mixture of acrylate and initiator was dropped for 1-10 hours. After reaction for 0.5-5 hours at the constant temperature, the organic solvent was removed by vacuum distillation, and then the polymerization product namely polyacrylate was obtained;

(2) graft copolymerization: the above polymerization product, water, emulsifier and molecular weight regulator were orderly added to the reactor with a risen temperature to 50-95° C. for stirring 10-30 minutes until homogeneously mixed. Then the fatty acid vinyl ester and initiator aqueous solution with a mass fraction of 5-50% were added respectively for 1-10 hours. After reaction for 1-5 hours at the constant temperature, the temperature was lowered to 25-40° C. and the obtained emulsion mixture was demulsified by adding inorganic salt saturated solution followed by 2-5 times of washing with deionized water, and then the graft copolymerization product was obtained;

(3) alcoholysis: the above graft copolymerization product was mixed with alcohol solvent and then added to the reactor with a risen temperature to 30-70° C. followed by adding inorganic base. After alcoholysis for 10-120 minutes, the alcohol solvent and by-products were removed by vacuum distillation, and then the polyacrylate-g-polyvinyl alcohol was obtained after drying;

(4) hydrolysis: the above polyacrylate-g-polyvinyl alcohol was mixed with water and then added to the reactor with a risen temperature to 30-70° C. followed by adding inorganic base. After hydrolysis for 10-120 minutes, the water solvent and by-products were removed by vacuum distillation, and then the polycarboxylate superplasticizer solution with a required concentration was finally obtained by adding an appropriate amount of water.

In the above-mentioned step (1), the organic solvent used in polymerization was methanol, ethanol, p-xylene, 200# solvent oil, glycol, toluene or cyclohexane, with the mass ratio of 2-10:1 to the acrylate; the molecular weight regulator used in polymerization was isopropanol, 1-dodecanethiol or isooctyl 3-mercaptopropionate, with the molar ratio of 0.001-0.05:1 to the acrylate; the acrylate used in polymerization was methacrylate, ethyl acrylate, n-propyl acrylate, butyl acrylate or amyl acrylate; the initiator used in polymerization was azobisisobutyronitrile, 2,2'-azobisisoheptonitrile, benzoyl peroxide, tert-butyl hydroperoxide, tert-butyl peroxybenzoate or di-tert-butyl peroxide, with the molar ratio of 0.001-0.05:1 to the acrylate;

In the above-mentioned step (2), the mass ratio of added water to polyacrylate mentioned in step (1) was 5-50:1; the emulsifier used in graft copolymerization was sodium laurate, sodium dodecyl sulfonate, sodium dodecyl sulfate or sodium stearate, with the molar ratio of 0.00002-0.004:1 to the added water; the molecular weight regulator used in graft copolymerization was 1-dodecanethiol, isopropanol, mercaptoacetic acid or mercaptopropionic acid, with the molar ratio of 0.001-0.05:1 to the fatty acid vinyl ester; the fatty acid vinyl ester used in graft copolymerization was vinyl acetate, vinyl propionate or vinyl butyrate, with the molar ratio of 3-45:1 to the acrylate mentioned in step (1); the solute of initiator aqueous solution used in graft copolymerization was potassium persulfate, sodium persulfate or ammonium persulfate, with the molar ratio of 0.1-0.2:1 to the acrylate mentioned in step (1); the inorganic salt saturated solution used in graft copolymerization was saturated sodium chloride solution, saturated calcium chloride solution or saturated aluminum chloride solution;

In the above-mentioned step (3), the alcohol used in alcoholysis was methanol, ethanol or propanol, with the molar ratio of 2-5:1 to the fatty acid vinyl ester mentioned in step (2); the inorganic base used in alcoholysis was sodium hydroxide or potassium hydroxide, with the molar ratio of 0.001-0.01:1 to the alcohol;

In the above-mentioned step (4), the molar ratio of water used in hydrolysis to the acrylate mentioned in step (1) was 2-10:1; the inorganic base used in hydrolysis was sodium hydroxide or potassium hydroxide, with the molar ratio of 0.001-0.01:1 to the water used in hydrolysis.

Compared with the prior synthetic process, the preparation method in this invention has several beneficial effects as follows:

1. From the theory of molecular structure design, this invention reported that the comb-shaped polycarboxylate superplasticizer with a structure of polyacrylic acid as main chain and poly(fatty acid vinyl ester) derivatives as side chain was finally synthesized by polymerization, graft copolymerization, alcoholysis and hydrolysis. This structure is similar to that of conventional polycarboxylate superplasticizer, and thus this is an important innovation and breakthrough in the field of superplasticizer structure, further widening the research scopes and research approaches of the subsequent development of new-type polycarboxylate superplasticizer.

2. The synthesized polycarboxylate superplasticizer has comb-shaped structure, involving the main chain of polycarboxylic acid which adsorbs on the surfaces of cement particles and the side chain of polyvinyl alcohol which plays a good stereo-hindrance effect. This comb-shaped structural polycarboxylate superplasticizer product with unique advantages and distinctive characteristics has good market competitiveness and application prospects due to its favorable effects on preventing flocculation of cement particles and improving stability of cement paste.

3. Compared with the traditional methods, the synthetic method disclosed in this invention is simple and easy-controllable, manifesting as the common and cheap raw materials for reaction and the conventional process such as free radical polymerization, graft copolymerization and alcoholysis steps. Based on no specific requirements for reaction equipments and experimental environment, there is also no special operation and expensive reagents needed in this method so that easily realize the industrialized production.

4. The preparation process for this polycarboxylate superplasticizer product has the characteristics of low energy-consumption, high safety, advanced environment-friendly technology, mild conditions and cleaner production with non-pollution and non-toxicity. The used fatty acid vinyl ester with a low price reduces the cost of products and enriches the diversification of raw materials, but also gets rid of polycarboxylate superplasticizer industry's dependence on ethylene oxide and propylene oxide, which can improve the competitiveness and development prospects of products.

5. The polycarboxylate superplasticizer synthesized in this invention exhibits good workability, dispersing ability, slump retention effect, initial paste fluidity and paste fluidity retention at lower dosage, but also exhibits good adaptability to different types of cements. Furthermore, this product shows a steady state, including no stratification at high concentration, no crystallization and good storage stability at low temperature. The product synthesized by this simple process still has many excellent performances, which are beneficial to achieving industrialized production, and thus there have good economic and social benefits.

DETAILED DESCRIPTION OF EMBODIMENTS

This invention is further specified by combining with the following examples, but the implementation of this invention is not restricted to this.

EXAMPLE 1

Firstly 200 g of methanol was added to the reactor with a risen temperature to 60° C. followed by adding 3.489 g of isopropanol, and then the mixture of 100 g of methyl acrylate and 0.288 g of 2,2'-azobisisoheptonitrile was dropped for 10 hours. After reaction for half an hour at the constant temperature, the methanol solvent was removed by vacuum distillation, and then the polymerization product namely poly(methyl acrylate) was obtained. 90 g of poly(methyl acrylate), 450 g of water, 22.2 g of sodium laurate and 9.42 g of isopropanol were orderly added to the reactor with a risen temperature to 50° C. for stirring 10 minutes until homogeneously mixed. Then 357.96 g of vinyl butyrate and 567 g of potassium persulfate aqueous solution with a mass fraction of 5% were added respectively for 10 hours. After reaction for 3 hours at the constant temperature, the temperature was lowered to 25° C. and the obtained emulsion mixture was demulsified by adding saturated sodium chloride solution followed by 2 times of washing with deionized water, and then the graft copolymerization product namely poly(methyl acrylate)-g-poly(vinyl butyrate) was obtained. 447.96 g of poly(methyl acrylate)-g-poly (vinyl butyrate) was mixed with 200.96 g of methanol solvent and then added to the reactor with a risen temperature to 30° C. followed by adding 2.512 g of sodium hydroxide. After alcoholysis for 120 minutes, the methanol solvent and by-products were removed by vacuum distillation, and then the poly(methyl acrylate)-g-polyvinyl alcohol was obtained after drying. 228.16 g of poly(methyl acrylate)-g-polyvinyl alcohol was mixed with 37.6812 g of water and then added to the reactor with a risen temperature to 30° C. followed by adding 0.84 g of sodium hydroxide. After hydrolysis for 120 minutes, the water solvent and by-products were removed by vacuum distillation, and then the polycarboxylate superplasticizer solution with a mass concentration of 40% was finally obtained by adding 320.25 g of water.

EXAMPLE 2

The performance of polycarboxylate superplasticizer solution with a mass concentration of 40% prepared in example 1 was measured after storing 15 days at 6° C.

EXAMPLE 3

Firstly 300 g of ethanol was added to the reactor with a risen temperature to 70° C. followed by adding 0.06 g of isopropanol, and then the mixture of 100 g of ethyl acrylate and 8.2 g of azobisisobutyronitrile was dropped for 8 hours. After reaction for 5 hours at the constant temperature, the ethanol solvent was removed by vacuum distillation, and then the polymerization product namely poly(ethyl acrylate) was obtained. 90 g of poly(ethyl acrylate), 4500 g of water, 55.5 g of sodium laurate and 18.18 g of 1-dodecanethiol were orderly added to the reactor with a risen temperature to 60° C. for stirring 15 minutes until homogeneously mixed. Then 1026 g of vinyl butyrate and 142.8 g of potassium persulfate aqueous solution with a mass fraction of 20% were added respectively for 8 hours. After reaction for 5 hours at the constant temperature, the temperature was lowered to 30° C. and the obtained emulsion mixture was demulsified by adding saturated calcium chloride solution followed by 4 times of washing with deionized water, and then the graft copolymerization product namely poly(ethyl acrylate)-g-poly(vinyl butyrate) was obtained. 1116 g of poly(ethyl acrylate)-g-poly(vinyl butyrate) was mixed with 1472 g of ethanol solvent and then added to the reactor with a risen temperature to 40° C. followed by adding 16.128 g of potassium hydroxide. After alcoholysis for 90 minutes, the ethanol solvent and by-products were removed by vacuum distillation, and then the poly(ethyl acrylate)-g-polyvinyl alcohol was obtained after drying. 486 g of poly(ethyl acrylate)-g-polyvinyl alcohol was mixed with 54 g of water and then added to the reactor with a risen temperature to 40° C. followed by adding 0.2 g of potassium hydroxide. After hydrolysis for 90 minutes, the water solvent and by-products were removed by vacuum distillation, and then the polycarboxylate superplasticizer solution with a mass concentration of 40% was finally obtained by adding 691.2 g of water.

EXAMPLE 4

The performance of polycarboxylate superplasticizer solution with a mass concentration of 40% prepared in example 3 was measured after storing 20 days at 6° C.

EXAMPLE 5

Firstly 400 g of p-xylene was added to the reactor with a risen temperature to 100° C. followed by adding 5.3146 g of 1-dodecanethiol, and then the mixture of 100 g of n-propyl acrylate and 2.56 g of di-tert-butyl peroxide was dropped for 6 hours. After reaction for 3 hours at the constant temperature, the p-xylene solvent was removed by vacuum distillation, and then the polymerization product namely poly (propyl acrylate) was obtained. 90 g of poly(propyl acrylate), 4000 g of water, 19.584 g of sodium dodecyl sulfonate and 9.076 g of mercaptoacetic acid were orderly added to the reactor with a risen temperature to 95° C. for stirring 30 minutes until homogeneously mixed. Then 1973 g of vinyl propionate and 75.15 g of sodium persulfate aqueous solution with a mass fraction of 40% were added respectively for 1 hour. After reaction for 5 hours at the constant temperature, the temperature was lowered to 40° C. and the obtained emulsion mixture was demulsified by adding saturated aluminum chloride solution followed by 5 times of washing with deionized water, and then the graft copolymerization product namely poly(propyl acrylate)-g-poly(vinyl propionate) was obtained. 2063 g of poly(propyl acrylate)-g-poly(vinyl propionate) was mixed with 4735.2 g of propanol solvent and then added to the reactor with a risen temperature to 50° C. followed by adding 18.94 g of sodium hydroxide. After alcoholysis for 10 minutes, the propanol solvent and by-products were removed by vacuum distillation, and then the poly(propyl acrylate)-g-polyvinyl alcohol was obtained after drying. 958.12 g of poly(propyl acrylate)-g-polyvinyl alcohol was mixed with 71.03 g of water and then added to the reactor with a risen temperature to 50° C. followed by adding 0.32 g of sodium hydroxide. After hydrolysis for 60 minutes, the water solvent and by-products were removed by vacuum distillation, and then the polycarboxylate superplasticizer solution with a mass concentration of 30% was finally obtained by adding 2158.2 g of water.

EXAMPLE 6

The performance of polycarboxylate superplasticizer solution with a mass concentration of 30% prepared in example 5 was measured after storing 30 days at 6° C.

EXAMPLE 7

Firstly 500 g of glycol was added to the reactor with a risen temperature to 130° C. followed by adding 3.16 g of 1-dodecanethiol, and then the mixture of 100 g of butyl acrylate and 5.67 g of benzoyl peroxide was dropped for 1 hours. After reaction for 5 hours at the constant temperature, the glycol solvent was removed by vacuum distillation, and then the polymerization product namely poly(butyl acrylate) was obtained. 90 g of poly(butyl acrylate), 3000 g of water, 16.2 g of sodium dodecyl sulfate and 14.84 g of mercaptopropionic acid were orderly added to the reactor with a risen temperature to 80° C. for stirring 20 minutes until homogeneously mixed. Then 1406 g of vinyl propionate and 49.88 g of ammonium persulfate aqueous solution with a mass fraction of 50% were added respectively for 6 hours. After reaction for 2 hours at the constant temperature, the temperature was lowered to 25° C. and the obtained emulsion mixture was demulsified by adding saturated calcium chloride solution followed by 5 times of washing with deionized water, and then the graft copolymerization product namely poly(butyl acrylate)-g-poly(vinyl propionate) was obtained. 1496 g of poly(butyl acrylate)-g-poly(vinyl propionate) was mixed with 4480 g of methanol solvent and then added to the reactor with a risen temperature to 60° C. followed by adding 7.87 g of potassium hydroxide. After alcoholysis for 30 minutes, the methanol solvent and by-products were removed by vacuum distillation, and then the poly(butyl acrylate)-g-polyvinyl alcohol was obtained after drying. 708.64 g of poly(butyl acrylate)-g-polyvinyl alcohol was mixed with 75.924 g of water and then added to the reactor with a risen temperature to 60° C. followed by adding 0.945 g of potassium hydroxide. After hydrolysis for 20 minutes, the water solvent and by-products were removed by vacuum distillation, and then the polycarboxylate superplasticizer solution with a mass concentration of 30% was finally obtained by adding 1561.1 g of water.

EXAMPLE 8

The performance of polycarboxylate superplasticizer solution with a mass concentration of 30% prepared in example 7 was measured after storing 15 days at 6° C.

EXAMPLE 9

Firstly 1000 g of toluene was added to the reactor with a risen temperature to 90° C. followed by adding 1.5347 g of isooctyl 3-mercaptopropionate, and then the mixture of 100 g of amyl acrylate and 2.53 g of tert-butyl hydroperoxide was dropped for 7 hours. After reaction for 4 hours at the constant temperature, the toluene solvent was removed by vacuum distillation, and then the polymerization product namely poly(amyl acrylate) was obtained. 90 g of poly(amyl acrylate), 5000 g of water, 1.7 g of sodium stearate and 5.76 g of 1-dodecanethiol were orderly added to the reactor with a risen temperature to 95° C. for stirring 30 minutes until homogeneously mixed. Then 2453.58 g of vinyl acetate and 72.28 g of ammonium persulfate aqueous solution with a mass fraction of 40% were added respectively for 5 hours. After reaction for 3 hours at the constant temperature, the temperature was lowered to 25° C. and the obtained emulsion mixture was demulsified by adding saturated aluminum chloride solution followed by 4 times of washing with deionized water, and then the graft copolymerization product namely poly(amyl acrylate)-g-poly(vinyl acetate) was obtained. 2543.58 g of poly(amyl acrylate)-g-poly(vinyl acetate) was mixed with 7874.28 g of ethanol solvent and then added to the reactor with a risen temperature to 70° C. followed by adding 13.69 g of sodium hydroxide. After alcoholysis for 30 minutes, the ethanol solvent and by-products were removed by vacuum distillation, and then the poly(amyl acrylate)-g-polyvinyl alcohol was obtained after drying. 1345.32 g of poly(amyl acrylate)-g-polyvinyl alcohol was mixed with 114.12 g of water and then added to the reactor with a risen temperature to 70° C. followed by adding 1.52 g of sodium hydroxide. After hydrolysis for 10 minutes, the water solvent and by-products were removed by vacuum distillation, and then the polycarboxylate superplasticizer solution with a mass concentration of 20% was finally obtained by adding 5203.88 g of water.

EXAMPLE 10

The performance of polycarboxylate superplasticizer solution with a mass concentration of 20% prepared in example 9 was measured after storing 30 days at 6° C.

EXAMPLE 11

Firstly 500 g of 200# solvent oil was added to the reactor with a risen temperature to 105° C. followed by adding 0.436 g of isooctyl 3-mercaptopropionate, and then the mixture of 100 g of butyl acrylate and 4.55 g of tert-butyl peroxybenzoate was dropped for 5 hours. After reaction for 3 hours at the constant temperature, the 200# solvent oil solvent was removed by vacuum distillation, and then the polymerization product namely poly(butyl acrylate) was obtained. 90 g of poly(butyl acrylate), 3600 g of water, 2.4337 g of sodium stearate and 12.65 g of isopropanol were orderly added to the reactor with a risen temperature to 80° C. for stirring 25 minutes until homogeneously mixed. Then 1813.74 g of vinyl acetate and 63.84 g of ammonium persulfate aqueous solution with a mass fraction of 50% were added respectively for 6 hours. After reaction for 3 hours at the constant temperature, the temperature was lowered to 30° C. and the obtained emulsion mixture was demulsified by adding saturated aluminum chloride solution followed by 3 times of washing with deionized water, and then the graft copolymerization product namely poly(butyl acrylate)-g-poly(vinyl acetate) was obtained. 1903.74 g of poly(butyl acrylate)-g-poly(vinyl acetate) was mixed with 2530.8 g of propanol solvent and then added to the reactor with a risen temperature to 45° C. followed by adding 11.81 g of potassium hydroxide. After alcoholysis for 45 minutes, the propanol solvent and by-products were removed by vacuum distillation, and then the poly(butyl acrylate)-g-polyvinyl alcohol was obtained after drying. 1017.96 g of poly(butyl acrylate)-g-polyvinyl alcohol was mixed with 101.23 g of water and then added to the reactor with a risen temperature to 50° C. followed by adding 2.52 g of potassium hydroxide. After hydrolysis for 60 minutes, the water solvent and by-products were removed by vacuum distillation, and then the polycarboxylate superplasticizer solution with a mass concentration of 20% was finally obtained by adding 3914.28 g of water.

EXAMPLE 12

The performance of polycarboxylate superplasticizer solution with a mass concentration of 20% prepared in example 11 was measured after storing 15 days at 6° C.

IMPLEMENTATION EFFECTS

1. Fluidities of Cement Pastes

For different cement types, the fluidities of cement pastes mixed with the polycarboxylate superplasticizers synthesized in each example at the same dosage were measured to investigate the effect of the synthesized polycarboxylate superplasticizer in this invention on the fluidity performances of different cements. The measurements were carried out according to GB/T8077-2012 (Methods for Testing Uniformity of Concrete Admixture) at a W/C of 0.35. The dosage of superplasticizer solution was the mass ratio of its solute to cement. The test results are shown in Table 1.

TABLE 1

Fluidities of cement pastes

| Cement | Dosage/% | Superplasticizer | Fluidity/mm 0 h | 1 h | 2 h |
|---|---|---|---|---|---|
| Reference cement | 2 | Example 1 | 295 | 257 | 218 |
| | | Example 2 | 292 | 263 | 232 |
| | | Example 3 | 289 | 257 | 227 |
| | | Example 4 | 286 | 258 | 226 |
| | | Example 5 | 294 | 261 | 230 |
| | | Example 6 | 283 | 251 | 227 |
| | | Example 7 | 287 | 256 | 228 |
| | | Example 8 | 294 | 260 | 231 |

TABLE 1-continued

Fluidities of cement pastes

| Cement | Dosage/% | Superplasticizer | Fluidity/mm 0 h | 1 h | 2 h |
|---|---|---|---|---|---|
| | | Example 9 | 289 | 259 | 221 |
| | | Example 10 | 296 | 256 | 223 |
| | | Example 11 | 288 | 243 | 217 |
| | | Example 12 | 285 | 253 | 219 |
| Jidong cement | 2 | Example 1 | 285 | 244 | 210 |
| | | Example 2 | 282 | 247 | 208 |
| | | Example 3 | 286 | 246 | 212 |
| | | Example 4 | 287 | 247 | 211 |
| | | Example 5 | 279 | 241 | 207 |
| | | Example 6 | 278 | 239 | 205 |
| | | Example 7 | 284 | 242 | 204 |
| | | Example 8 | 283 | 245 | 210 |
| | | Example 9 | 288 | 244 | 208 |
| | | Example 10 | 285 | 241 | 212 |
| | | Example 11 | 278 | 237 | 203 |
| | | Example 12 | 276 | 238 | 204 |
| Liulihe cement | 2 | Example 1 | 287 | 242 | 210 |
| | | Example 2 | 279 | 237 | 208 |
| | | Example 3 | 282 | 240 | 211 |
| | | Example 4 | 279 | 239 | 209 |
| | | Example 5 | 284 | 241 | 210 |
| | | Example 6 | 276 | 237 | 206 |
| | | Example 7 | 275 | 239 | 207 |
| | | Example 8 | 279 | 240 | 206 |
| | | Example 9 | 280 | 239 | 207 |
| | | Example 10 | 281 | 243 | 210 |
| | | Example 11 | 272 | 232 | 204 |
| | | Example 12 | 276 | 236 | 208 |
| Lafarge cement | 2 | Example 1 | 288 | 257 | 221 |
| | | Example 2 | 292 | 255 | 219 |
| | | Example 3 | 289 | 256 | 220 |
| | | Example 4 | 290 | 253 | 218 |
| | | Example 5 | 287 | 256 | 225 |
| | | Example 6 | 286 | 258 | 223 |
| | | Example 7 | 291 | 257 | 218 |
| | | Example 8 | 293 | 260 | 220 |
| | | Example 9 | 291 | 260 | 219 |
| | | Example 10 | 290 | 258 | 218 |
| | | Example 11 | 284 | 253 | 214 |
| | | Example 12 | 288 | 255 | 213 |
| Shandong cement | 2 | Example 1 | 275 | 231 | 204 |
| | | Example 2 | 273 | 233 | 202 |
| | | Example 3 | 276 | 229 | 199 |
| | | Example 4 | 274 | 231 | 203 |
| | | Example 5 | 270 | 234 | 205 |
| | | Example 6 | 269 | 230 | 197 |
| | | Example 7 | 273 | 229 | 198 |
| | | Example 8 | 274 | 231 | 201 |
| | | Example 9 | 271 | 228 | 196 |
| | | Example 10 | 275 | 234 | 206 |
| | | Example 11 | 267 | 226 | 193 |
| | | Example 12 | 269 | 227 | 192 |

From Table 1, all of the polycarboxylate superplasticizer solutions synthesized in this invention exhibit the excellent dispersing ability and adaptability to cement pastes at the W/C of 0.35 and dosage of 2.0%.

2. Fluidities of Cement Pastes at Lower Dosage

The greatest feature of this polycarboxylate superplasticizer product is that its cement paste fluidity still can remain good dispersing performance at the lower dosages (1.2%-1.8%) and same W/C. The measurements were carried out according to GB/T8077-2012 (Methods for Testing Uniformity of Concrete Admixture) at the W/C of 0.35, and the Reference cement was used for testing. The dosage of superplasticizer solution was the mass ratio of its solute to cement. The test results are shown in Table 2.

TABLE 2

Fluidities of cement pastes at lower dosage

| W/C | Dosage/% | Superplasticizer | Fluidity/mm 0 h | 1 h | 2 h |
|---|---|---|---|---|---|
| 0.35 | 1.2 | Example 1 | 184 | 151 | 113 |
|  |  | Example 2 | 184 | 154 | 115 |
|  |  | Example 3 | 187 | 155 | 114 |
|  |  | Example 4 | 180 | 153 | 116 |
|  |  | Example 5 | 181 | 148 | 113 |
|  |  | Example 6 | 176 | 152 | 108 |
|  |  | Example 7 | 181 | 155 | 109 |
|  |  | Example 8 | 183 | 151 | 117 |
|  |  | Example 9 | 178 | 151 | 106 |
|  |  | Example 10 | 182 | 147 | 112 |
|  |  | Example 11 | 177 | 148 | 109 |
|  |  | Example 12 | 176 | 150 | 110 |
| 0.35 | 1.5 | Example 1 | 203 | 167 | 122 |
|  |  | Example 2 | 207 | 177 | 124 |
|  |  | Example 3 | 206 | 174 | 123 |
|  |  | Example 4 | 205 | 173 | 122 |
|  |  | Example 5 | 200 | 174 | 118 |
|  |  | Example 6 | 207 | 171 | 117 |
|  |  | Example 7 | 199 | 175 | 120 |
|  |  | Example 8 | 204 | 170 | 121 |
|  |  | Example 9 | 199 | 168 | 118 |
|  |  | Example 10 | 200 | 169 | 116 |
|  |  | Example 11 | 205 | 168 | 122 |
|  |  | Example 12 | 196 | 171 | 115 |
| 0.35 | 1.8 | Example 1 | 234 | 204 | 164 |
|  |  | Example 2 | 231 | 199 | 162 |
|  |  | Example 3 | 228 | 196 | 164 |
|  |  | Example 4 | 234 | 204 | 163 |
|  |  | Example 5 | 233 | 198 | 166 |
|  |  | Example 6 | 235 | 203 | 161 |
|  |  | Example 7 | 234 | 204 | 170 |
|  |  | Example 8 | 233 | 200 | 165 |
|  |  | Example 9 | 240 | 198 | 166 |
|  |  | Example 10 | 232 | 198 | 165 |
|  |  | Example 11 | 225 | 191 | 158 |
|  |  | Example 12 | 227 | 194 | 160 |

From Table 2, for the polycarboxylate superplasticizer solutions synthesized in this invention at lower dosage, their cement pastes all exhibit excellent initial fluidities and fluidity retentions.

3. Slump and Slump Flow of Concrete

The concrete slump, slump flow and their retentions for the polycarboxylate superplasticizers synthesized in each example in this invention were measured, and the test results are shown in Table 3. Reference cement was used for testing, and the dosage of superplasticizer solution was the mass ratio of its solute to cement.

TABLE 3

Flow properties of concretes

| Superplasticizer | Cement/g | Water/g | Sand/g | Gravel/g | Fly ash/g | Slag/g | Dosage/% | Slump/Slump flow/mm 0 h | 1 h |
|---|---|---|---|---|---|---|---|---|---|
| Example 1 | 320 | 145 | 815 | 988 | 96 | 83 | 3 | 245/540 | 220/475 |
| Example 2 | 320 | 145 | 815 | 988 | 96 | 83 | 3 | 235/520 | 205/450 |
| Example 3 | 320 | 145 | 815 | 988 | 96 | 83 | 3 | 240/535 | 220/470 |
| Example 4 | 320 | 145 | 815 | 988 | 96 | 83 | 3 | 250/545 | 210/465 |
| Example 5 | 320 | 145 | 815 | 988 | 96 | 83 | 3 | 245/550 | 225/475 |
| Example 6 | 320 | 145 | 815 | 988 | 96 | 83 | 3 | 235/525 | 220/475 |
| Example 7 | 320 | 145 | 815 | 988 | 96 | 83 | 3 | 235/525 | 205/455 |
| Example 8 | 320 | 145 | 815 | 988 | 96 | 83 | 3 | 240/525 | 210/460 |
| Example 9 | 320 | 145 | 815 | 988 | 96 | 83 | 3 | 245/545 | 225/475 |
| Example 10 | 320 | 145 | 815 | 988 | 96 | 83 | 3 | 245/540 | 220/470 |
| Example 11 | 320 | 145 | 815 | 988 | 96 | 83 | 3 | 225/505 | 205/455 |
| Example 12 | 320 | 145 | 815 | 988 | 96 | 83 | 3 | 220/495 | 200/445 |

From Table 3, all of the concretes for polycarboxylate superplasticizer solutions synthesized in this invention exhibit excellent slump, slump flow and their retentions.

What is claimed is:

1. A preparation method of a polycarboxylate superplasticizer by graft copolymerization of fatty acid vinyl ester onto acrylate polymer, comprising a polymerization step, a graft copolymerization step, an alcoholysis step and a hydrolysis step in sequence, wherein:
    (1) polymerization: firstly an organic solvent is added to a reactor with an elevated temperature to 60-130° C. followed by adding a first molecular weight regulator, and then a mixture of acrylate and initiator is dropped for 1-10 hours; after reaction for 0.5-5 hours at constant temperature, the organic solvent is removed by vacuum distillation, and then a polymerization product is obtained;
    (2) graft copolymerization: the polymerization product, water, emulsifier and a second molecular weight regulator are orderly added to the reactor with an elevated temperature to 50-95° C., stirring for 10-30 minutes until homogeneously mixed; then a fatty acid vinyl ester and an initiator aqueous solution with a mass fraction of 5-50% are added respectively for 1-10 hours; after reaction for 1-5 hours at constant temperature an emulsion mixture is obtained, the temperature is lowered to 25-40° C. and the emulsion mixture is demulsified by adding an inorganic salt saturated solution followed by 2-5 times of washing with deionized water, and then a graft copolymerization product is obtained;
    (3) alcoholysis: the graft copolymerization product is mixed with an alcohol solvent and then added to the reactor with an elevated temperature to 30-70° C. followed by adding an inorganic base; after alcoholysis for 10-120 minutes, the alcohol solvent and by-products are removed by vacuum distillation, and then a polyacrylate-g-polyvinyl alcohol is obtained after drying;
    (4) hydrolysis: the polyacrylate-g-polyvinyl alcohol is mixed with water and then added to the reactor with an elevated temperature to 30-70° C. followed by adding another inorganic base; after hydrolysis for 10-120 minutes, the water and by-products are removed by vacuum distillation, and then a polycarboxylate superplasticizer solution is obtained by adding water;

wherein in step (1), the organic solvent used in polymerization comprises methanol, ethanol, p-xylene, glycol, toluene or cyclohexane, with a mass ratio of the organic solvent to the acrylate being 2-10:1; the first molecular weight regulator used in the polymerization comprises isopropanol, 1-dodecanethiol or isooctyl 3-mercaptopropionate, with a molar ratio of the first molecular weight regulator to the acrylate being 0.001-0.05:1; the acrylate used in the polymerization comprises methyl acrylate, ethyl acrylate, n-propyl acrylate, butyl acrylate or amyl acrylate; the initiator used in the polymerization comprises azobisisobutyronitrile, 2,2'-azobisisoheptonitrile, benzoyl peroxide, tert-butyl hydroperoxide, tert-butyl peroxybenzoate or di-tert-butyl peroxide, with a molar ratio of the initiator to the acrylate being 0.001-0.05:1;

in step (2), a mass ratio of added water to the polymerization product in step (1) is 5-50:1; the emulsifier used in the graft copolymerization comprises sodium laurate, sodium dodecyl sulfonate, sodium dodecyl sulfate or sodium stearate, with a molar ratio of the emulsifier to the added water being 0.00002-0.004:1; the second molecular weight regulator used in the graft copolymerization comprises 1-dodecanethiol, isopropanol, mercaptoacetic acid or mercaptopropionic acid, with a molar ratio of the second molecular weight regulator to the fatty acid vinyl ester being 0.001-0.05:1; the fatty acid vinyl ester used in the graft copolymerization comprises vinyl acetate, vinyl propionate or vinyl butyrate, with a molar ratio of the fatty acid vinyl ester to the acrylate in step (1) being 3-45:1; solute of the initiator aqueous solution used in the graft copolymerization comprises potassium persulfate, sodium persulfate or ammonium persulfate, with a molar ratio of the solute to the acrylate mentioned in step (1) being 0.1-0.2:1; the inorganic salt saturated solution used in the graft copolymerization comprises saturated sodium chloride solution, saturated calcium chloride solution or saturated aluminum chloride solution;

in step (3), the alcohol used in the alcoholysis comprises methanol, ethanol or propanol, with a molar ratio of the alcohol to the fatty acid vinyl ester in step (2) being 2-5:1; the inorganic base used in the alcoholysis comprises sodium hydroxide or potassium hydroxide, with a molar ratio of the inorganic base to the alcohol being 0.001-0.01:1;

in step (4), a molar ratio of water used in the hydrolysis to the acrylate in step (1) is 2-10:1; the another inorganic base used in the hydrolysis comprises sodium hydroxide or potassium hydroxide, with a molar ratio of the another inorganic base to the water used in the hydrolysis being 0.001-0.01:1.

\* \* \* \* \*